UNITED STATES PATENT OFFICE.

JOSEPH HAROLD MANDLEBERG, OF PENDLETON, MANCHESTER, ENGLAND.

COMPOSITION FOR IMPREGNATING AND COATING BALLOON AND LIKE FABRICS.

1,302,065.

Specification of Letters Patent.  Patented Apr. 29, 1919.

No Drawing.   Application filed January 18, 1919.  Serial No. 271,918.

*To all whom it may concern:*

Be it known that I, JOSEPH HAROLD MANDLEBERG, a subject of the King of Great Britain and Ireland, and resident of Albion Waterproofing Works, Pendleton, Manchester, England, have invented certain new and useful Improvements Relating to Compositions for Impregnation and Coating of Balloon and like Fabrics, of which the following is a specification.

This invention relates to a coating composition for balloon and like fabrics or materials and has for its object to provide an improved composition mainly consisting of india-rubber for impregnating and coating said fabrics or materials, which shall impart to the latter a higher degree of impermeability to the hydrogen or other content of the balloon or the like relatively to the weight of the composition per unit of area treated than the compositions mainly consisting of india-rubber heretofore employed for the said purpose, so that for any predetermined degree of impermeability a fabric or material treated with said improved composition as hereinafter described, shall be of less weight than similar materials treated with known compositions.

For the improved composition aforesaid, I employ hard finely divided Pará rubber which, prior to incorporation with the remaining materials of the composition, is worked by water cooled dry mixing rollers for a short period, preferably, however, longer than is usual in preparing rubber for manufacture. Wax, preferably ceresin wax, is then added and thoroughly mixed with the rubber, and afterward litharge is worked into the composition for a short period. Precipitated sulfur is now sprinkled evenly over the mass and the whole worked up so that thorough incorporation of the ingredients takes place and the nerve or texture of the rubber is practically destroyed. Care must be taken not to over-work, which may give oxidation troubles after the lapse of time. I find for example, that in working with a quantity of 25 lbs., and with mixing rollers of 16 (sixteen) inches diameter and co-acting rollers having differential speeds of 25 (twenty five) and 13 (thirteen) revolutions per minute respectively, a total of 50 (fifty) minutes working upon the rubber and for the incorporation of the ingredients will produce the desired condition of the mixture.

We have found the following examples of proportions of the ingredients to give very satisfactory results:—

(1)

| | | |
|---|---|---|
| Hard fine Pará rubber | 100 | parts by weight. |
| Ceresin wax | 1 | part by weight. |
| Litharge | ¾ | part by weight. |
| Precipitated sulfur | 2 | parts by weight. |

(2)

| | | |
|---|---|---|
| Hard fine Pará rubber | 100 | parts by weight. |
| Ceresin wax | 3 | parts by weight. |
| Litharge | 1 | part by weight. |
| Precipitated sulfur | 2 to 3 | parts by weight. |

The composition prepared as aforesaid is removed from the mixing rollers in as loose or open a condition as practicable in order that its heat shall be readily dissipated. It may now be in sheet form or be passed through a sheeting machine producing thin sheets so as to allow of rapid and uniform action of solvent thereon. I employ a suitable low boiling point solvent, such as very pure qualities of coal tar naphtha or benzene, in which the material is allowed to soak for a considerable period prior to wet mixing in a machine whereby a thoroughly homogeneous mass, free from lumps, is produced.

The solution of the composition is applied to the fabric or material by a suitable spreading machine, the temperature of spreading being maintained below the boiling point of the solvent to prevent the formation of bubbles. Preferably the first two coats applied to the fabric are of a very thin or weak solution so that thorough impregnation is insured. The remaining coats may be of uniform or varying thickness. The number of coats applied to the material may be varied according to requirements. If, for example, it is desired to add 95 grams of the composition per square meter, of fabric, I prefer to effect this in at least sixteen coats, as I find this to give the best results.

The coatings are arranged with relation to the fabric in the ordinary manner, that is to say they may be between plies of the fabric or partly between and partly outside the fabric. The outside or exposed layer, before vulcanization is effected, is preferably dusted with talc.

After drying, vulcanization is effected, the temperature being raised slowly. Thus for example, very good results are obtained with steam vulcanization in which the fabric is protected from contact with the steam by another fabric or material so that the steam acting on the latter exerts pressure on the impregnated fabric, the vulcanization being carried out at about 200° F., the period occupied in raising the temperature being say ¾ hour while the maximum temperature may be maintained for say 1½ to 2 hours. Good results are, however, obtainable when working at temperatures of from 285 to 295° F. The high temperature and pressure of vulcanization have very beneficial results in improving the impermeability of the fabric.

I have found that the efficiency of the fabric is considerably increased if it be impregnated with petroleum jelly or soft paraffin. To obtain the best results it is necessary to employ petroleum jelly of a very high degree of purity. For example, the impregnation may be effected after vulcanization is completed by the direct application of the material to the fabric. Or, the material may be dissolved in a suitable solvent which facilitates its application, the fabric being afterward heated to evaporate the solvent.

I desire it to be understood that petroleum jelly or soft paraffin as hereinbefore referred to is the yellowish semi-solid or viscous mixture of hydrocarbons, usually made by purifying the residue left on distilling petroleum.

The proportions of the materials used may be varied, the limits of proportions of the materials added to 100 parts by weight of hard fine Pará rubber with the production of satisfactory results, being:—ceresin or paraffin wax from 1 to 5 parts; litharge from ¾ to 2 parts; and sulfur from 2 to 4 parts.

Having now described my invention what I claim as new and desire to secure by Letters Patent is:—

1. An impregnating and coating composition for balloon and like fabrics, containing 100 parts per weight of rubber, 1 to 5 parts of wax, ¾ to 2 parts of litharge, and 2 to 4 parts of sulfur, said ingredients being thoroughly mixed.

2. An impregnating and coating composition for balloon and like fabrics containing as essential ingredients 100 parts of rubber, 1 to 3 parts of ceresin wax, ¾ to 1 part of litharge, 2 to 3 parts of precipitated sulfur, said materials being thoroughly mixed with each other and with a thinning agent.

3. An impregnating and coating composition for balloon and like fabrics comprising rubber, wax, litharge, and sulfur, thoroughly incorporated with each other and with a thinner, the said rubber being non-elastic.

4. A coating and impregnating composition comprising 100 parts of hard Pará rubber, 1 part of ceresin wax, ¾ part of litharge, 2 parts of precipitated sulfur, all thoroughly incorporated in an aromatic solvent.

In testimony whereof I have signed my name to this specification.

JOSEPH HAROLD MANDLEBERG.